United States Patent Office 2,880,987
Patented Apr. 7, 1959

2,880,987
PRODUCTION OF METALS

Milo P. Hnilicka, Jr., Concord, and James L. Vaughan, Needham, Mass., assignors to National Research Corporation, Cambridge, Mass., a corporation of Massachusetts Application February 14, 1956, Serial No. 565,411

4 Claims. (Cl. 266—9)

This invention relates to the production of metals and in particular to the production of refractory metals such as titanium, zirconium and the like of high purity suitable for nuclear energy applications.

A principal object of the present invention is to provide improved apparatus for producing a refractory metal such as zirconium by the reduction of a compound of the refractory metal.

Another object of the invention is to provide improved apparatus for purifying the refractory metal produced.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The present invention is particularly directed to improved apparatus for the production and purification of refractory metals such as titanium, zirconium and the like. For convenience of illustration, the invention will be initially described in connection with apparatus designed for the production and purification of zirconium by a process wherein a zirconium halide such as zirconium tetrachloride is reduced to zirconium metal by means of a reducing agent such as magnesium. This specific embodiment is given for illustrative purposes only and is not intended to limit the scope of the invention.

In a preferred form of apparatus embodying the present invention, there is provided a horizontal, cylindrical, vacuum-tight reaction chamber of sufficient size to contain at least one elongated, horizontal reactor pan for holding a metallic reducing agent (e.g., magnesium) within the reaction chamber. Means are provided adjacent the surface of the magnesium in the reactor pan for maintaining an atmosphere of a volatile halide of a refractory metal (e.g., zirconium tetrachloride). The reactor pan, having a relatively small surface-to-volume ratio, is provided with means for moving it through a door located at one end of the reaction chamber and into a second cylindrical, vacuum-tight chamber. This second chamber is provided with means for holding the reactor pan on edge to permit drainage of the molten reaction by-product (magnesium chloride) and unreacted metal reducing agent (magnesium) contained within the refractory metal. For economic reasons, it is preferable to use two reactor pans during the reaction. Thus the holding means in the second chamber is preferably arranged to hold the reactor pans on edge with their axes generally parallel to, and on opposite sides of, the axis of the second chamber and with the open tops of the reactor pans facing each other. Both the reaction chamber and second chamber are provided with means for heating and evacuating.

Figure 1:
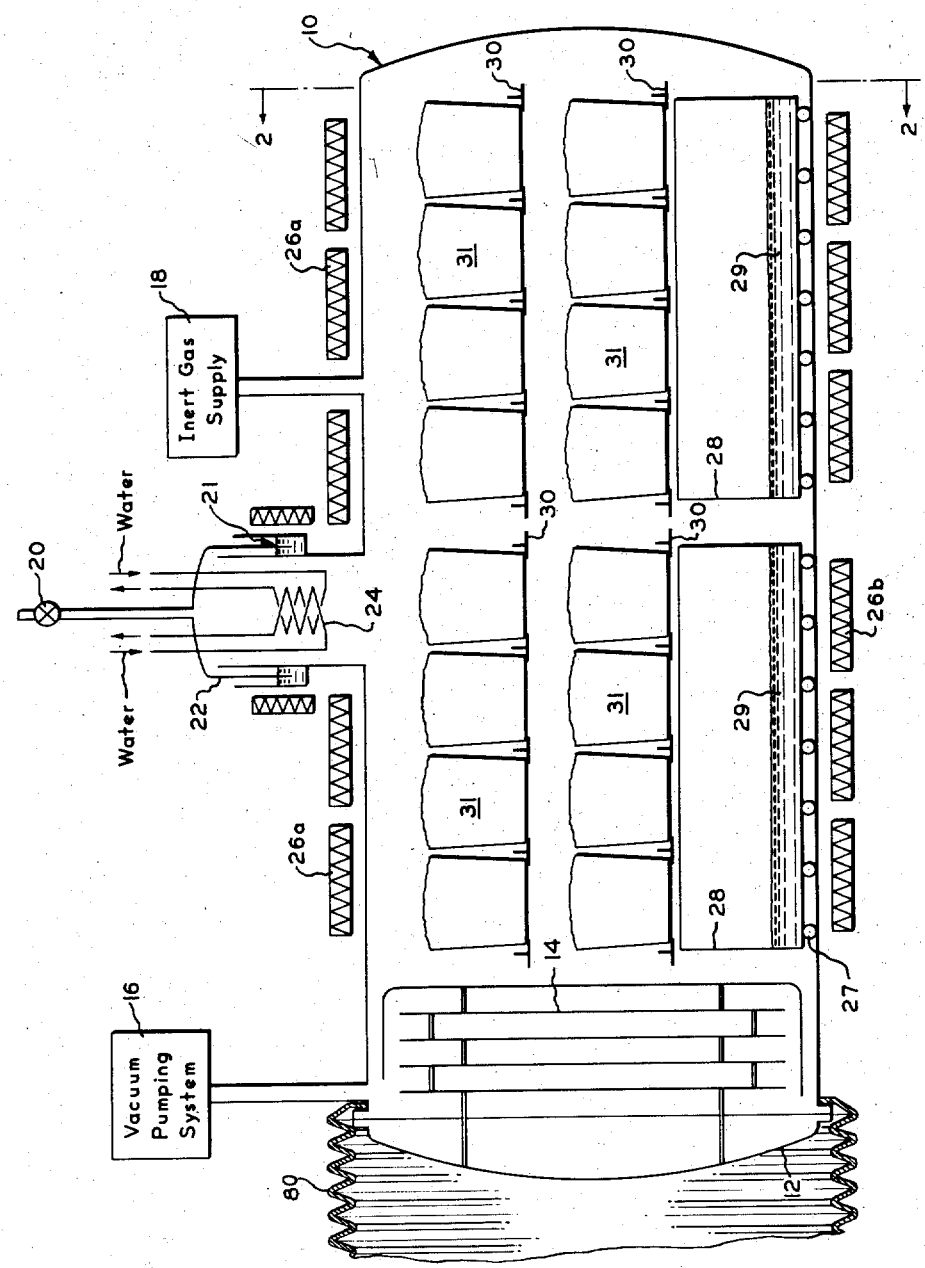
Fig. 1 is a diagrammatic embodiment of one form of the invention.

Referring now to Fig. 1, there is illustrated one embodiment of the invention wherein 10 is a horizontal, cylindrical, vacuum-tight reaction chamber provided with a door 12 at one end thereof. Attached to the door 12 are a plurality of radiant heat shields 14 to prevent undue heating of the door 12. The reaction chamber 10 is provided with a vacuum pumping system 16 for evacuating the air and volatile impurities from the reactants from the reaction chamber 10 prior to the reaction. The air removed is replaced by an inert gas such as helium from a suitable storage supply indicated at 18 so that a helium atmosphere is present at the start of the reaction. In order to compensate for the variations in pressure within the reaction chamber 10 during the reduction run, there is provided a bleeding valve 20 on a floating top 22. A lead alloy seal 21 is provided between the floating top 22 and reaction chamber 10 to exclude the atmosphere therefrom. The floating top 22 contains cooling coils 24 to prevent escape of any volatilized zirconium tetrachloride from the reaction chamber 10. Although only one floating top assembly, consisting of components 20, 21, 22 and 24, is shown, several such assemblies may be provided. Likewise, although only one inert gas inlet and supply 18 is shown, there may be additional inlets located at suitable places about the reaction chamber 10. The entire reaction chamber 10, except for the door 12 and radiant shields 14, is surrounded and heated by suitable heating elements 26a and 26b. The upper portion of reaction chamber 10 is heated by means of heating elements 26a while the lower portion thereof is heated by means of heating elements 26b.

The reaction chamber 10 preferably contains two elongated, horizontal reactor pans 28 for holding liquid metallic reducing agent 29 (e.g., magnesium) within the reaction chamber 10. The reactor pans 28 are preferably semi-cylinders and, accordingly, have relatively small surface-to-volume ratios. The semi-cylindrical reactor pans 28 provide a maximum surface area for the reaction between magnesium and zirconium tetrachloride and a minimum surface area at which contamination from reactor pan material can occur. The reactor pans 28 can be made of or fabricated from a material which has a eutectic point with zirconium higher than that at which the reaction takes place. Several types of steel can be used, but the temperature range between the zirconium-iron eutectic point and the reaction temperatures is not too great. Reactor pans made of chromium or molybdenum are very satisfactory. It is preferable, however, to provide reactor pans made of steel and clad or lined on their inner surface with a thin layer of chromium or molybdenum. The pans are provided with means 27 for sliding or moving them in and out of the reaction chamber 10. Adjacent the tops of reactor pans 28 and the surface of the magnesium 29, there are provided a plurality of supports 30 for holding sufficient quantities of solid zirconium tetrachloride 31 in suitable containers 32. The supports 30 are carried by the reactor pans 28. Containers 32 can be made of suitable high-temperature metals. The cylindrical nature of reaction chamber 10 and the arrangement of containers 32 therein provide, when heated, adequate radiation area for each container so as to secure complete and uniform heating of the whole contents thereof while avoiding any hot spots.

Figure 2:
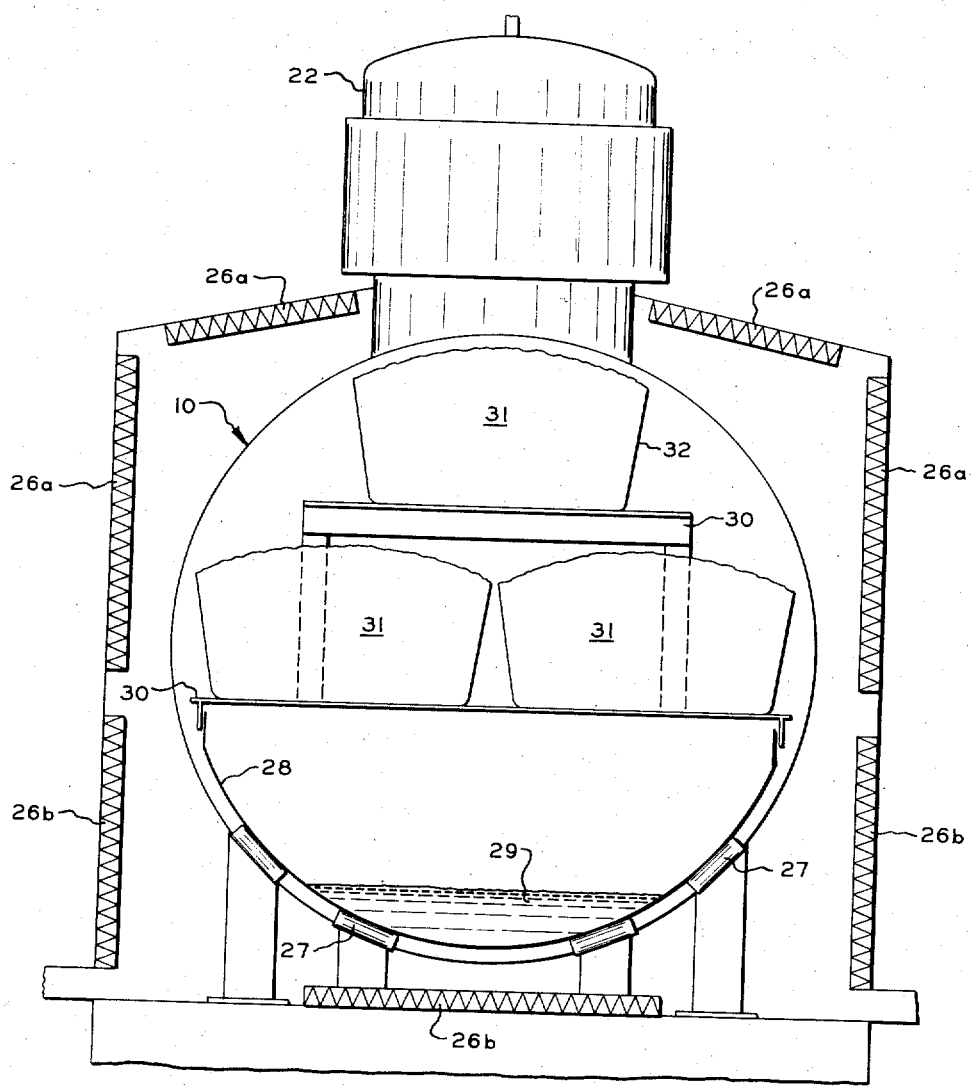
Fig. 2 is a diagrammatic, enlarged, sectional view taken along the line 2—2 of Fig. 1.

Fig. 2, an enlarged sectional view taken along the line 2—2 of Fig. 1, illustrates more clearly the preferred geometric shape of the reactor pans 28, the arrangement of supports 30 with containers 32 thereon, and the arrangement of heating elements 26a and 26b about the reaction chamber 10.

Preparatory to carrying out a reaction, sufficient quantities of the solid zirconium tetrachloride 31 are placed in containers 32. This operation is preferably carried out in a humidity-controlled room or atmosphere. Dry conditions are preferable, since zirconium tetrachloride readily reacts with moisture to form zirconium oxide and such contamination is undesirable. The reactor pans 28 are charged with sufficient magnesium 29. Supports 30 are placed on or attached to the reactor pans 28 and then loaded with the prefilled containers 32. The reactor pans 28, carrying supports 30 with the stacked containers 32 thereon, are moved into the reaction chamber 10, which is then sealed from the atmosphere. Water is circulated through the cooling coils 24 and the lead alloy seal 21 about the floating top 22 is frozen. The reaction chamber 10 is then evacuated and the upper portion thereof heated to a temperature somewhat below that at which the zirconium tetrachloride sublimes by means of heating elements 26a. Each container 32 is completely and uniformly heated so as to permit the decomposition of any impurities contained in the zirconium tetrachloride 31. The volatile impurities are removed from the reaction chamber 10 during the evacuation thereof. This procedure provides for additional purification of the zirconium tetrachloride 31. Upon completion of the evacuation and zirconium tetrachloride purification, helium is introduced to provide an inert atmosphere for the start of the reaction. The temperature of the reaction chamber is then raised by means of heating elements 26a and 26b. The lead alloy seal 21, between the floating top 20 and the reaction chamber 10, is melted and periodic bleeding of the chamber 10 is accomplished to compensate for the expansion of the helium gas. The temperature of the reaction chamber 10 is increased so that the magnesium is melted and the zirconium tetrachloride sublimed. The zirconium tetrachloride exothermally reacts with the magnesium in the reactor pans 28 to produce zirconium and by-product magnesium chloride. The semi-cylindrical reactor pans 28 provide a maximum surface area at which the zirconium tetrachloride and magnesium can come into contact with each other. Additionally, they permit better control of the reaction temperature and thus aid in preventing runaway, very high-temperature reactions which often cause alloying of the zirconium and the reactor pan material. Upon completion of the reaction, the heating elements 26a and 26b are shut off and the reaction chamber 10 is allowed to cool. The reactor pans 28 are then moved through door 12 and transferred, by suitable means such as tracks, to a purification apparatus indicated in Fig. 3. Since the reaction mass, at this point, is very hydroscopic and pyrophoric, avoidance of moisture is desired. Thus it is preferable that, when the reactor pans are being transferred along suitable means to the purification apparatus, the atmosphere be controlled so as to be substantially free of moisture. This may be accomplished by covering the transfer area between the two apparatus with a portable or removable semi-cylindrical shell (schematically indicated at 80 in Figs. 1 and 3) provided with suitable humidity-controlling apparatus 81.

The purification apparatus comprises an outer cylindrical, vacuum-tight chamber or shell 40 and inner cylindrical, vacuum-tight chamber or shell 42, there being provided therebetween suitable heat insulation 41. The outer chamber 40 is connected by means 43 to its own vacuum pumping system (not shown). The inner chamber 42 is provided with reactor pan holding means 44. These means preferably consist of A frame supports 45, arranged in a cradle 46, and are capable of holding the reactor pans 28 on edge with their open tops facing each other. These holding means 44 preferably hold the reactor pans 28 with their axes generally parallel to, and on opposite sides of, the axis of the chamber 42. Holding means 44 is provided with moving means 47 for introducing the supports 45 and cradle 46 with reactor pans 28 thereon into chamber 42 along roller ways 48. Attached to one end of the holding means 44 are a plurality of heat shields 49.

Positioned below the holding means 44 and reactor pans 28 is at least one salt-receiving chamber 50 and preferably a plurality of such which may be cooled by suitable means. Each salt-receiving chamber 50 contains therein a suitable removable or disposable container 51. The receiving chambers 50 are provided with air-tight opening means 52 for ease in inserting and removing container 51. Collecting conduits 53 are positioned below holding means 44 for carrying molten magnesium chloride in a free-falling stream through passages 54, which extend from chamber 42 into the salt-receiving chambers 50. To provide for thermal expansion between chambers 40 and 42, these passages 54 are provided with flexible, vacuum-tight means 55. The chamber 42 is provided with a door 56 at one end thereof, which door is carried by a movable platform 58. To eliminate large vacuum connections, the movable platform 58 may carry an integral suitable vacuum pumping system 60 for evacuating chamber 42. Attached to door 56 is a cylinder 62 which is inserted in an elongated, cooled throat 64. The cooled throat 64 and cylinder 62 are maintained at relatively low temperatures by cooling coils 66. Cylinder 62 carries a plurality of condenser plates 68, which are cooled by cooling coils 69, for condensing and retaining salt (magnesium chloride) and unreacted magnesium volatilized from the product metal 70 in the reactor pans 28. Chamber 42 is surrounded and heated by means of heating elements 72.

Figure 3:
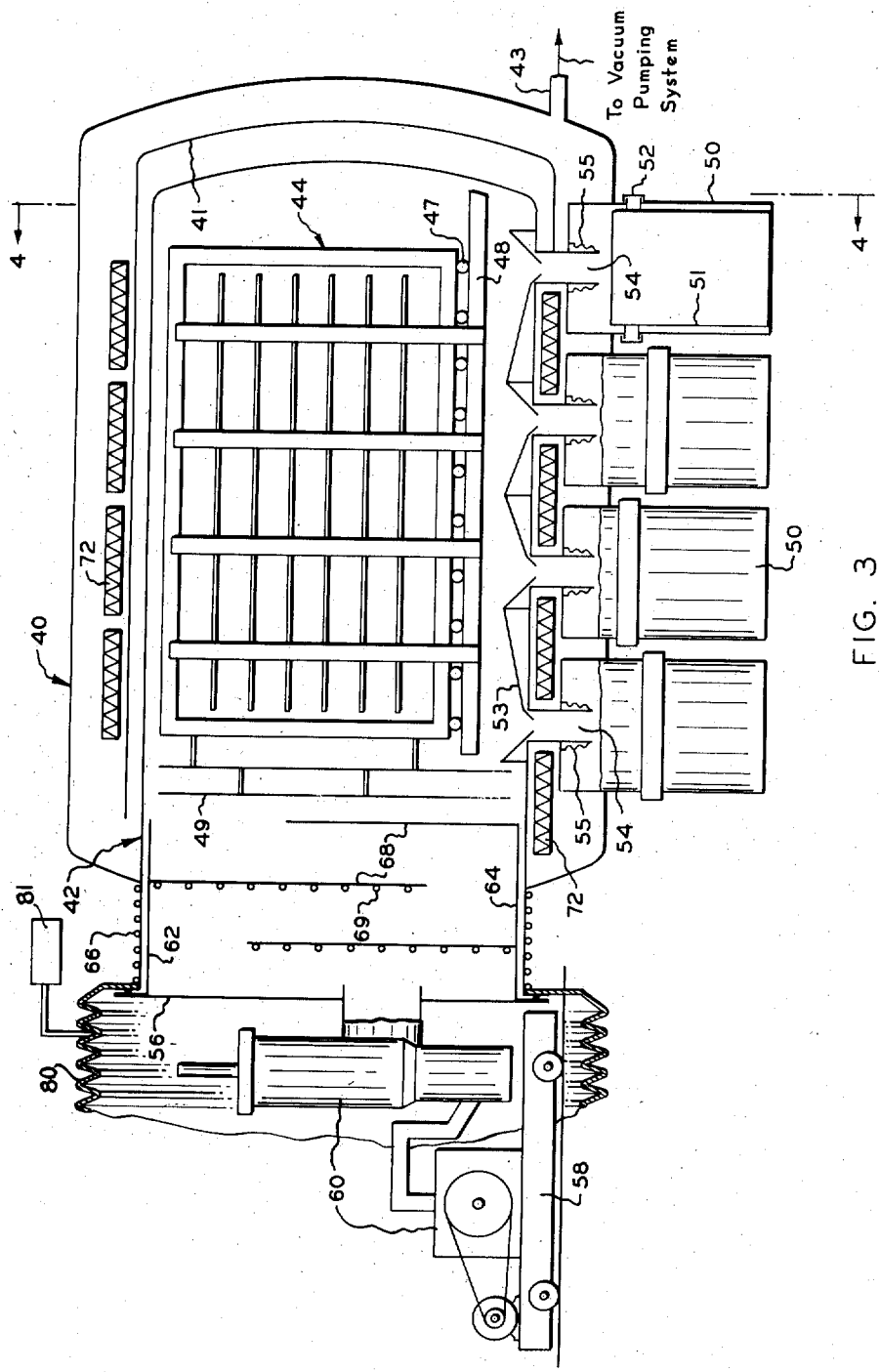
Fig. 3 is a diagrammatic embodiment of another form of the invention.
Figure 4:
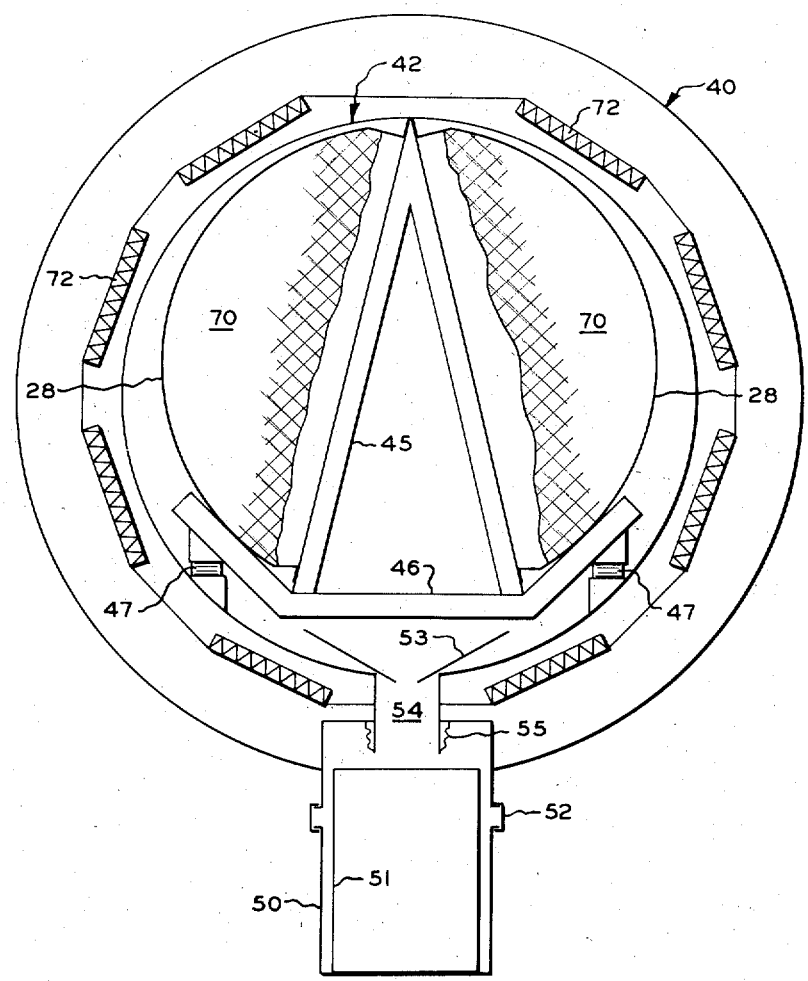
Fig. 4 is a diagrammatic, enlarged, sectional view taken along the line 4—4 of Fig. 3.

Fig. 4, an enlarged sectional view taken along the line 4—4 of Fig. 3, illustrates more clearly the preferred A frame support 45 arranged in cradle 46 and the support of the reactor pans 28 thereon containing the product metal 70 to be purified.

The operation of the above apparatus consists of transferring the reactor pans 28 along suitable means from the reaction chamber 10 to the purification apparatus and loading the reactor pans 28, under an atmosphere substantially free of moisture, on holding means 44 in the preferred manner. The holding means 44 with the reactor pans 28 are then moved into chamber 42. The door 56 and its attachments are moved into position and chamber 42 is made vacuum tight. Chambers 40 and 42 are then evacuated and water is circulated through cooling coils 66 and 69 to cool the throat section 64 and condenser plates 68 respectively. Chamber 42 is then raised to a suitable temperature by heating elements 72 to melt the magnesium chloride and unreacted magnesium contained in the product metal 70 in reactor pans 28. Molten magnesium chloride draining from reactor pans 28 is channeled by means of collecting conduits 53 through the passages 54 into the salt-receiving chambers 50 provided with removable containers 51. Residual salt and magnesium in the product metal 70 is volatilized by further temperature rise. Volatilized magnesium chloride and magnesium are condensed on the cooled condenser plates 68. After completion of the purification and cooling of the apparatus, the reactor pans 28 are unloaded from chamber 42, preferably under the same controlled conditions of humidity as stated above. The high-purity zirconium sponge is then easily removed from the reactor pans 28. The salt-receiving chambers 50 are opened and the removable containers 51 containing magnesium chloride are replaced by empty containers in preparation for a new run.

Since certain changes may be made in the above apparatus without departing from the scope of the invention herein involved, it is intended that all matter contained

What is claimed is:

1. Apparatus for producing a refractory metal such as titanium, zirconium and the like, said apparatus comprising a horizontal, cylindrical, vacuum-tight reaction chamber, at least two elongated, horizontal reactor pans for holding liquid metallic reducing agent within the reaction chamber, means providing an atmosphere of a volatile halide of a refractory metal adjacent the surface of the liquid metallic reducing agent to cause reduction of the volatile halide to the refractory metal in sponge form in the reactor pans, a door at one end of said reaction chamber, means for sliding said reactor pans through said door into and out of said chamber, radiant heat shields on said door, means for transferring said reactor pans from said first chamber to a second cylindrical, vacuum-tight chamber, means for holding said reactor pans on edge in said second chamber to permit drainage of molten salt therefrom, said holding means being arranged to hold said pans with their longitudinal axes generally parallel to, and on opposite sides of, the axis of said second chamber and with the open tops of said pans facing each other, means for heating both of said chambers, and means for evacuating both of said chambers.

2. Apparatus for producing a refractory metal such as titanium, zirconium and the like, said apparatus comprising a horizontal, cylindrical, vacuum-tight reaction chamber, at least two elongated, horizontal reactor pans for holding charges of liquid metallic reducing agent within the reaction chamber, means providing an atmosphere of a volatile halide of a refractory metal adjacent the surface of the liquid metallic reducing agent to cause reduction of the volatile halide to the refractory metal in sponge form in the reactor pans, a door at one end of said reaction chamber, means for sliding said reactor pans through said door into and out of said chamber, radiant heat shields on said door, means for evacuating said chamber, means for transferring said reactor pans for said chamber to a second cylindrical, vacuum-tight chamber, means for holding said reactor pans on edge in said second chamber to permit drainage of molten salt therefrom, said holding means being arranged to hold said pans with their longitudinal axes generally parallel to, and on opposite sides of, the axis of said second chamber and with the open tops of said pans facing each other, at least one salt-receiving chamber positioned below and outside of said second cylindrical chamber, and means providing passage of molten salt into said salt-receiving chamber which flows from said reactor pans, and means for heating said reaction chamber and said second chamber.

3. Apparatus for producing a refractory metal such as titanium, zirconium and the like, said apparatus comprising a horizontal, cylindrical, vacuum-tight reaction chamber, at least two elongated, horizontal reactor pans for holding charges of liquid metallic reducing agent within the reaction chamber, means providing an atmosphere of a volatile halide of a refractory metal adjacent the surface of the liquid metallic reducing agent to cause reduction of the volatile halide to the refractory metal in sponge form in the reactor pans, a door at one end of said reaction chamber, means for sliding said reactor pans through said door into and out of said chamber, radiant heat shields on said door, means for evacuating said chamber, means for transferring said reactor pans from said chamber to a second cylindrical, vacuum-tight chamber, means for holding said reactor pans in said second chamber to permit drainage of molten salt therefrom, a door for said second chamber at one end thereof, said door being carried by a movable platform, a vacuum pumping system carried by said platform, condenser plates carried by said door for condensing salt and other vapors volatilized from the product metal in the reactor pans, an elongated, cooled throat at one end of said second chamber, said throat terminating in an opening which is closed by the door for said second chamber, a cylinder carried by said door to be inserted in the cooled throat, the condenser plates being carried in said cylinder, and means for heating said reaction chamber and said second chamber.

4. Apparatus for producing a refractory metal such as titanium, zirconium and the like, said apparatus comprising a horizontal, cylindrical, vacuum-tight reaction chamber, at least one elongated, horizontal reactor pan for holding charges of liquid metallic reducing agent within the reaction chamber, means providing an atmosphere of a volatile halide of a refractory metal adjacent the surface of the liquid metallic reducing agent to cause reduction of the volatile halide to the refractory metal in sponge form in the reactor pan, a door at one end of said reaction chamber, means for sliding said reactor pan through said door into and out of said chamber, radiant heat shields on said door, means for evacuating said chamber, means for transferring said reactor pan from said chamber to a second cylindrical, vacuum-tight chamber, means for holding said reactor pan on edge in said second chamber to permit drainage of molten salt therefrom, said holding means being arranged to hold said pan with the top of said pan at a large angle to the horizontal, with its longitudinal axis generally parallel to the axis of said second chamber, and with its open top unobstructed to permit ready escape of vapors therefrom, at least one salt-receiving chamber positioned below and outside of said second cylindrical chamber, means providing passage of molten salt into said salt-receiving chamber which flows from said reactor pan, means for evacuating said second chamber, means for condensing, and means for heating said reaction chamber and said second chamber.

References Cited in the file of this patent

UNITED STATES PATENTS

| 1,544,870 | Stevens | July 7, 1925 |
| 2,482,127 | Schlechten et al. | Sept. 20, 1949 |

FOREIGN PATENTS

| 628,147 | Great Britain | Aug. 23, 1949 |